(12) United States Patent
Rahman et al.

(10) Patent No.: US 6,684,483 B2
(45) Date of Patent: Feb. 3, 2004

(54) METHOD OF FABRICATING A ROTOR FOR AN ELECTRIC TRACTION MOTOR

(75) Inventors: Khwaja M. Rahman, Torrance, CA (US); Peter James Savagian, Bloomfield Hills, MI (US); Francois J. Biais, Torrance, CA (US); Constantin C. Stancu, Anaheim, CA (US)

(73) Assignee: General Motors Corporation, Detroit, MI (US)

(*) Notice: Subject to any disclaimer, the term of this patent is extended or adjusted under 35 U.S.C. 154(b) by 109 days.

(21) Appl. No.: 09/952,319

(22) Filed: Sep. 14, 2001

(65) Prior Publication Data

US 2003/0052561 A1 Mar. 20, 2003

(51) Int. Cl.⁷ .................. H02K 15/00; H02K 15/02; H01F 7/06; B23P 17/00
(52) U.S. Cl. .................. 29/596; 29/598; 29/419.2; 29/607; 310/156.02
(58) Field of Search .......... 29/596, 598, 419.2, 29/608, 421.1, 607; 310/156.02, 166, 168; 148/10

(56) References Cited

U.S. PATENT DOCUMENTS

| | | | | |
|---|---|---|---|---|
| 3,858,308 A | * | 1/1975 | Peterson | 148/103 |
| 4,948,999 A | * | 8/1990 | Bertram et al. | 310/156.43 |
| 5,200,729 A | * | 4/1993 | Soeda et al. | 335/284 |
| 6,069,431 A | * | 5/2000 | Satoh et al. | 310/256 |
| 6,262,507 B1 | * | 7/2001 | Sato et al. | 29/596 |
| 6,274,960 B1 | * | 8/2001 | Sakai et al. | 310/166 |
| 6,472,789 B1 | * | 10/2002 | Akemakou | 310/156.57 |

* cited by examiner

Primary Examiner—Carl J. Arbes
Assistant Examiner—Thiem Duh Phan
(74) Attorney, Agent, or Firm—Christopher DeVries

(57) ABSTRACT

A method of fabricating a rotor for an electric traction motor including the steps of forming cavities in the rotor, injecting magnetic material in a portion of the cavities, injecting nonmagnetic material in a portion of the cavities, and post-magnetizing the magnetic material.

8 Claims, 3 Drawing Sheets

US 6,684,483 B2

METHOD OF FABRICATING A ROTOR FOR AN ELECTRIC TRACTION MOTOR

TECHNICAL FIELD

The present invention relates generally to electric or hybrid electric vehicle propulsion systems. More specifically, the present invention relates to the design of electric traction motors or machines for use in electric or hybrid vehicles.

BACKGROUND OF THE INVENTION

In today's automotive market, there exists a variety of electric propulsion or drive technologies used to power vehicles. The technologies include electric traction motors such as DC motors, AC induction motors, switched reluctance motors, synchronous reluctance motors, brushless DC motors and corresponding power electronics. Brushless DC motors are of particular interest for use as traction motors in an electric vehicle because of their superior performance characteristics, as compared to DC motors and AC induction motors. Brushless DC motors typically operate with a permanent magnet rotor. A permanent magnet rotor may be configured as a surface mount or interior or buried permanent magnet rotor. An interior permanent magnet (IPM) motor or machine has performance attributes, when compared to DC motors and AC induction motors, that include relatively high efficiency, relatively high torque, relatively high power densities, and a long constant power operating range which make an IPM machine attractive for vehicle propulsion applications.

Permanent magnets buried inside a rotor for a brushless DC motor exhibit high reluctance directly along the magnetic axis or the d-axis due to the low permeability of the permanent magnets. While along the q-axis, between the magnetic poles or magnet barriers of an IPM rotor, there exists no magnetic barrier, and reluctivity to magnetic flux is very low. This variation of the reluctance around the rotor creates saliency in the rotor structure of an IPM machine. Therefore, the IPM rotors have reluctance torque in addition to the permanent magnet torque generated by the magnets buried inside the rotor. Reluctance in the d-axis can be created by one magnet such as found in a single barrier rotor design.

A single magnet of the one barrier rotor design can also be split into several layers creating a multi-barrier design. The multi-barrier design reduces leakage and improves the rotor saliency. Accordingly, motors having multi-barrier rotors have numerous performance advantages over a single barrier rotor design, including relatively high overall efficiency, extended high speed constant power operating range, and improved power factor. Improved saliency of the multi-barrier rotor helps to lower the amount of magnets or magnetic material in an IPM machine, as compared to a single barrier IPM machine or surface mounted permanent magnet machine, by reducing dependency on magnetic torque. The amount of magnetic material needed to generate a specific torque and wattage rating depends on the level of saliency of the rotor. The higher the rotor saliency, the lower the magnet material usage for the same overall machine performance. Electric motors having a multi-barrier rotor design, as compared to single barrier design, generate higher rotor saliency.

The reduction of magnetic material in an electric motor rotor is desirable from a cost standpoint. Lower amounts of magnetic material usage also alleviate some of the problems that are encountered in permanent magnet machines, such as fault problems and also spin loss problems due to the magnetic field generated by rotor magnets that is present even if the motor is not producing any torque. A pure synchronous reluctance motor that has similar rotor geometry to the multi-barrier permanent magnet (PM) design but no magnetic material in the rotor is a relatively low performance machine. The multi-barrier IPM electric motors have the beneficial attributes of both the synchronous reluctance machine and the permanent magnet machine and are excellent candidates for vehicle propulsion. The major difficulty involved with IPM machines is the design and manufacture of the rotor.

Magnets in an IPM machine can be pre-magnetized and then inserted inside the rotor. This magnet insertion is a complex and relatively costly step that adds manufacturing steps to the assembly of the IPM machine.

Post-magnetization of inserted magnetic material is possible if the magnets are inserted near the rotor surface, as shown in FIG. 2. For post-magnetization, magnetic material may be preformed outside of the rotor, inserted into the rotor, and then magnetized. This is usually the case with sintered magnets, which require a certain orientation. A further type of magnetic material used that may be used in an IPM rotor is bonded magnets, which are usually mixed with a plastic, such as PPS, and may also be preformed outside of the rotor and then inserted into the rotor. However, generally bonded magnetic material is injected into the rotor cavities under high temperature and pressure.

Electric motors having multi-layer buried magnets in their rotors, as shown in FIG. 4, exhibit excellent performance characteristics for vehicle propulsion application. The problems associated post-magnetizing such a rotor geometry would result in a large amount of magnetic material buried deep within the rotor that may only partially magnetize or not magnetize at all, resulting in a waste of material. Post-magnetization works efficiently for only magnetic material buried or located near the surface of the rotor as shown in FIG. 2. For magnetic material buried relatively deep in the rotor, post-magnetization is difficult due to the weakening of the magnetizing field.

SUMMARY OF THE INVENTION

The present invention includes a method and apparatus for the design of an IPM machine rotor. The present invention removes magnetic material from the regions of the rotor which cannot be effectively or strongly magnetized during the post-magnetization process. For instance, the entire outer barrier of the rotor of FIG. 4 can be easily magnetized. However, the middle section of the inner regions of the rotor may not be exposed to a magnetic field strong enough to fully magnetize these regions. In the present invention, magnetic material is removed from these areas and may be kept void of any material. This ensures the high reluctance to the magnet axis or the d-axis needed to produce the saliency in the rotor.

In alternative embodiments of the present invention, the middle regions of an IPM rotor may be filled with non-magnetic thermal material to allow rotor heat to escape through the motor shaft area, improving the rotor thermal performance. Keeping the middle region of a rotor void of any material or inserting non-magnetic thermal material does not change the rotor saliency or the reluctance torque. However, removing magnetic material from certain regions of the rotor will reduce the magnetic field and, as a consequence, the torque produced by this magnetic field and the interaction of the stator current will be reduced. To compensate for the loss of magnetic field and the corresponding magnetic torque, the magnetic field strength of the remaining magnetic material is increased.

The strength of a magnet is typically defined by the magnetic energy product (MEP). MEP is proportional to the product of magnetic remnant flux density, $B_r$, and the coercivity, $H_c$. MEP is measured in units of energy per unit volume. When this energy product is multiplied by the total magnetic volume, the amount of MEP or energy from the magnet is obtained. It has been verified by finite element simulation that the magnetic torque remains substantially the same if the MEP times the magnetic material volume is substantially the same in both the geometries shown in FIGS. 4 and 5. Accordingly, the MEP of the magnets of the geometry of FIG. 5 needs to be improved in the same proportion as the magnetic material volume is reduced due to the removal of magnetic material near the center and middle of the rotor. Magnetic material cost is also related to the magnetic energy product and the total magnetic material volume. The relationship is complex and also depends on many other factors such as the chemical composition of the magnetic material, magnetic type, and the type of processing. However, the total magnetic material cost will be reduced without a loss of motor performance if the total magnetic material volume is reduced and the MEP multiplied by the magnetic material volume remaining in the motor rotor is substantially the same.

By reducing the amount of magnetic material used in the IPM rotor of the present invention and keeping the MEP times the magnet volume substantially the same, the cost of the IPM motor may be reduced. Furthermore, this invention would allow complete magnetization of the outer as well as the inner magnetic material or barriers, thus reducing the volume of valuable magnetic material in the rotor and the cost of the motor, as the manufacturing and material cost will be reduced. Furthermore, motor mass will be reduced as a consequence of the reduced magnetic material volume or mass, and thermal performance of the rotor will also be improved, enabling the cooling of the magnetic barriers.

DESCRIPTION OF THE PREFERRED EMBODIMENT

Figure 1:
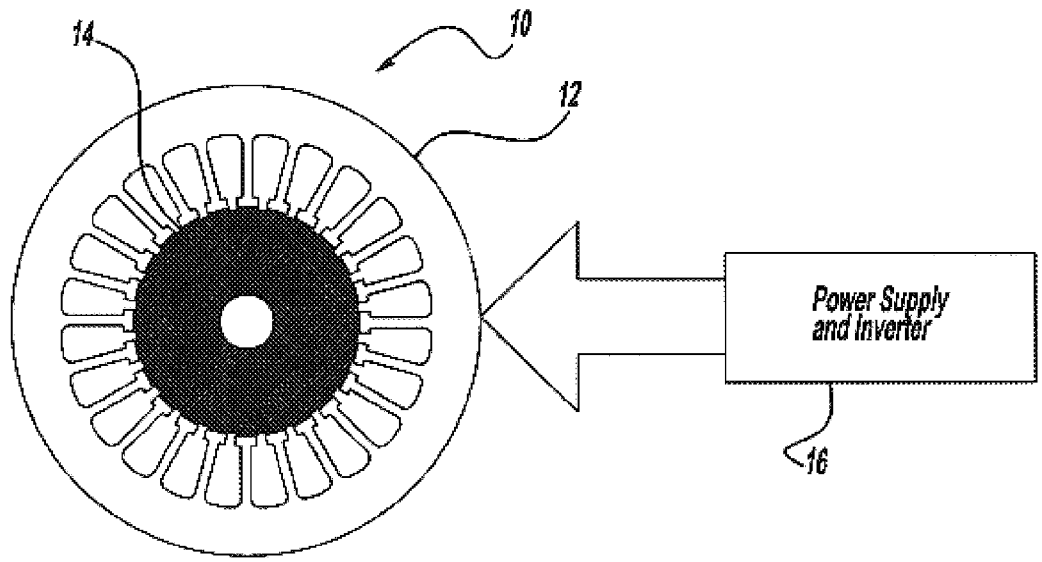
FIG. 1 is a diagrammatic cross-sectional drawing of a permanent magnet motor.

FIG. 1 is a diagrammatic drawing of a permanent magnet motor 10 having a wound stator 12 and permanent magnet rotor 14. A power supply and inverter 16 commutate and control the speed and torque of the motor 10 in response to feedback including, but not limited to, an encoder, resolver, tachometer, proximity switch and tooth set, and back emf detection. The motor may be characterized as a brushless DC motor with square wave or sinewave excitation provided by the power supply and inverter 16.

Figure 2:
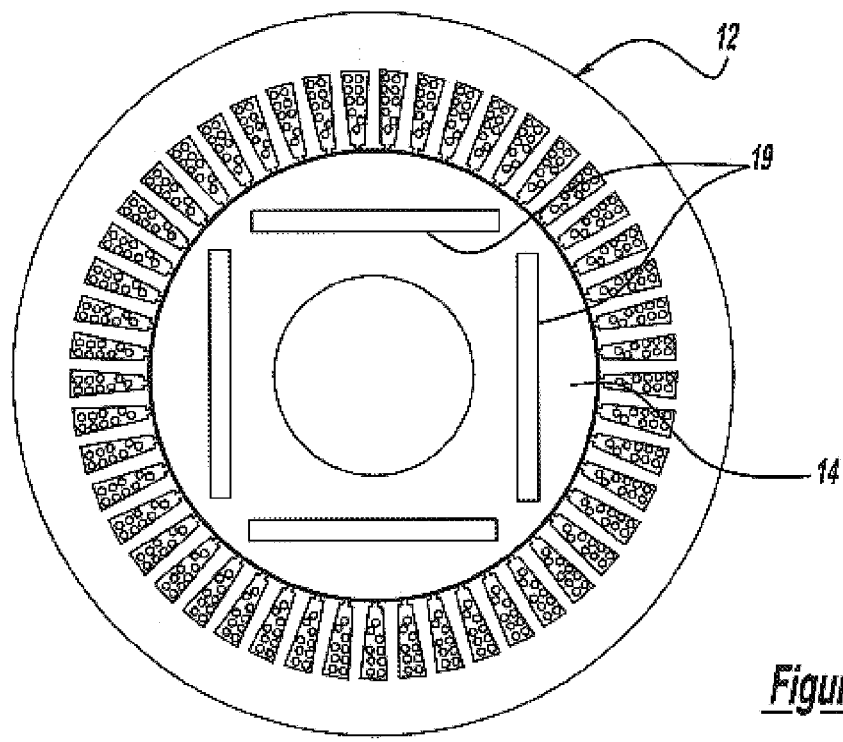
FIG. 2 is a diagrammatic cross-sectional drawing of a permanent magnet motor with magnets buried near the surface of the rotor.

FIG. 2 is a diagrammatic cross-sectional drawing of a permanent magnet rotor 14 with magnetic material 19 buried near the surface of the rotor 14. The magnetic material because of its position proximate to the rotor 14 surface may be magnetized by a magnetizing fixture or the wound stator 12 during a post-magnetization process. The post-magnetization process in one embodiment of the present invention includes positioning a magnetizing fixture around the rotor 14 to magnetize the magnetic material 19 in the rotor 14. Magnetizing fixtures similar to the stator 12 contain windings which are used for the magnetization process. The stator 12 may also be used to magnetize the rotor 14 instead of a magnetizing fixture in alternate embodiments of the present invention.

In a preferred embodiment of the present invention, magnetic powder mixed with plastic may be injected into rotor 14 cavities under high temperatures and pressure, allowing the material to bond and form inside the rotor 14 cavity. This process is desirable for large scale production. As mentioned earlier, post-magnetization of the magnetic material is currently only practical if the magnetic material is buried near the rotor surface.

Magnetic material, depending on it composition, requires varying magnetic field strengths to become fully magnetized. The high energy magnets which are preferred for variable speed motor drive applications due to their higher demagnetization strength require very high magnetic fields to saturate the magnetic material to become fully magnetized. The magnetic field is produced by the flow of current in the stator 12 winding or in a magnetizing fixture. Usually a very high current burst is needed for a very short period of time to magnetize the rotor 14. If the stator 12 lacks sufficient iron, it may become saturated during this process, preventing the generated magnetic field from penetrating into the rotor 14.

In the preferred embodiment of the present invention, the rotor 14 is magnetized by a magnetization fixture. The magnetizing fixture includes enough iron to prevent it from becoming very saturated. Windings in the magnetizing fixture are placed such that the magnetic field is guided along a desired magnetization direction.

Figure 3:
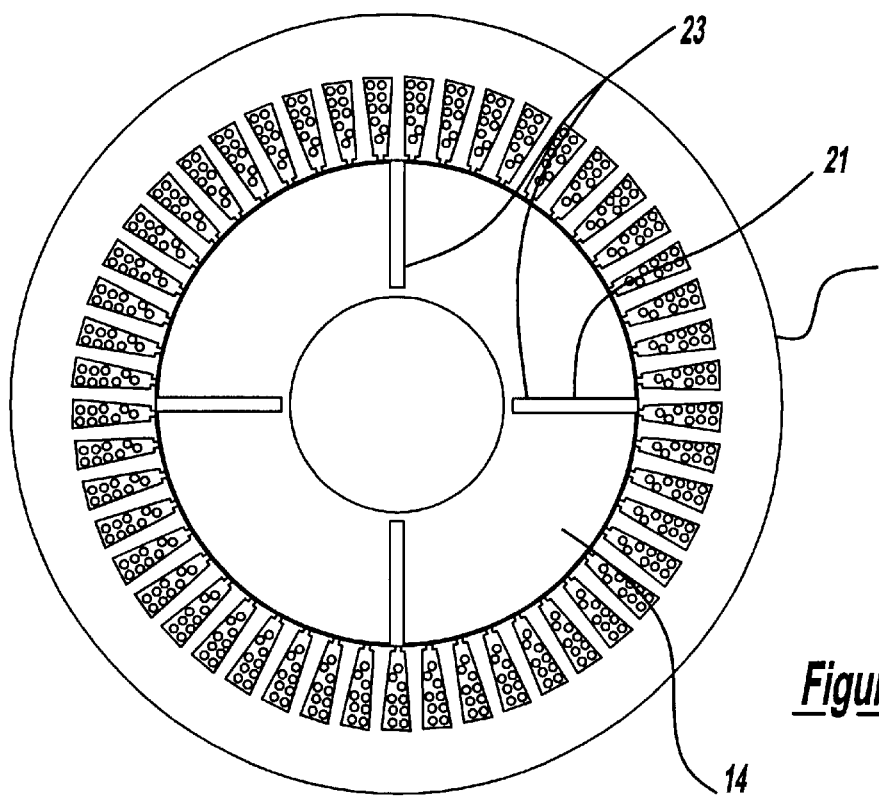
FIG. 3 is a diagrammatic cross-sectional drawing of a permanent magnet motor with a spoke-type rotor configuration of magnetic material.

FIG. 3 is a diagrammatic cross-sectional drawing of a permanent magnet rotor 14 with a spoke-type configuration of magnetic material 21. The regions 23 of the magnetic material 21 are difficult to magnetize due to the distance from the rotor surface 14. As described previously, a magnetic field produced by a magnetizing fixture or the stator 12 winding would generally fail to penetrate deep inside the rotor 14. Therefore, the regions 23 will only be partially or incompletely magnetized during the post-magnetization process. Incomplete or partial magnetization of the magnetic material will reduce the air gap flux. Therefore, both the machine torque and the machine efficiency will also be reduced, as compared to a rotor where the regions 23 are completely magnetized.

Figure 4:
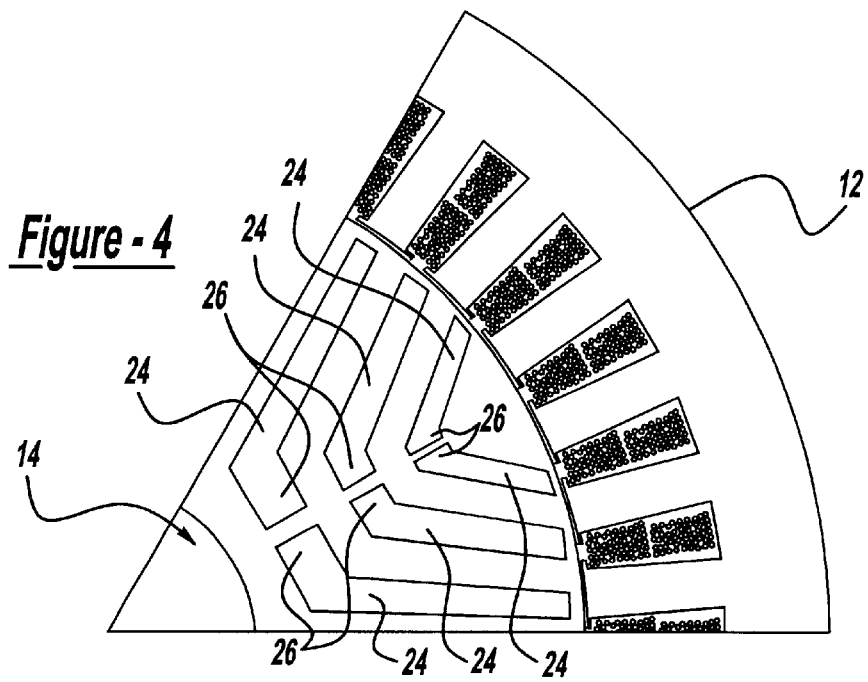
FIG. 4 is a partial (one pole) cross-section of a multi-layer interior or buried magnet rotor geometry.

FIG. 4 is a partial cross-section of a multi-layer or barrier buried magnet rotor geometry. Similar to the spoke-type configuration of FIG. 3, regions 26 of the magnetic material layers or barriers 24 will be difficult to fully magnetize because of the distance from the rotor 14 surface.

As described previously, multi-layer or barrier geometry for an IPM rotor improves the rotor 14 saliency. Accordingly, the rotor 14 geometry of FIG. 4 has the advantage of having relatively high saliency, which improves the machine torque density and lowers the magnetic material volume requirements for a specific torque or wattage. Lower magnetic material volume requirements lower the motor cost and also alleviate the problems associated with high flux PM machines, such as short circuit and open circuit fault problems, and spin losses (eddy current induced losses) due to the presence of the permanent magnet field. Multi-barrier rotor geometries also have the advantage of favorable torque speed profile, with extended constant power range, for vehicle propulsion application. This multi-layer design may have magnetic material in all the layers 24 as shown in FIG. 4 or it may have magnetic material in one or more layers 24 while the other layers are empty. The particular design depends on the magnet flux requirements, the type of magnetic material, and the saliency requirement. Despite all these favorable attributes, multi-layer designs are difficult to produce due to the difficulty of magnetizing all the magnet layers 24, especially the regions 26 of the layers 24.

Figure 5:
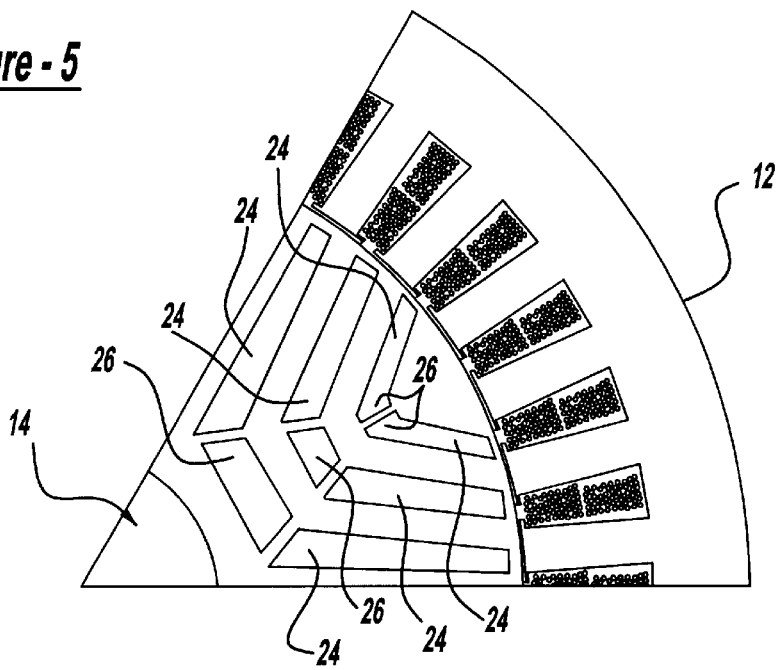
FIG. 5 illustrates the removal of magnetic material from the central region of the rotor of FIG. 4.

FIG. 5 illustrates the removal of magnetic material from the central region of the rotor of FIG. 4. The present invention removes magnetic material from areas of the rotor 14 such as regions 26 where it is difficult to magnetize the magnetic material. These regions 26 are filled with air or an inert or non-magnetic heat-conducting material such as heat conductive epoxy. Since the magnetic field deep inside the rotor is almost DC, materials such as non-magnetic stainless steel or aluminum, which have excellent thermal conductivity, may also used. The removal of magnetic material from the rotor 14 areas which cannot be magnetized will lower the magnetic flux in the machine air-gap, hence machine torque due to the magnet flux will be reduced. To compensate for the removal of magnetic material from regions 26, the magnetic strength of the remaining magnetic material is increased. Magnetic field strength of the remaining material is increased such that the magnet air-gap flux remains unchanged. This ensures that the magnet torque is not reduced.

As disclosed previously, magnetic field strength is defined by the magnet remnant flux density $B_r$ and the magnet coercivity $H_c$. $B_r$ is the measure of the magnetic flux density when the two ends of the magnet (magnet north and magnet south) is shorted using a highly permeable magnetic material. $H_c$ is the measure of the field strength that would be required to drive the total flux within the magnet to zero. Magnetic energy product (MEP) is proportional to the product of the magnet remnant flux density and the magnet coercivity, which has a unit of Joules per unit volume. MEP multiplied by the total magnet volume gives the total energy of the magnet formed by the magnetic material. In order to keep the magnet flux unaltered in the air-gap, the MEP for the design of FIG. 5 is increased by the same proportion as the volume of magnetic material is reduced from FIG. 4. Thus, the MEP times the magnet volume will remain substantially unchanged for the rotor geometries of FIGS. 4 and 5.

Actual cost of the magnetic material is a complex function of many factors, such as the type of magnets, chemical composition of the magnetic material, the MEP, magnetic material volume, magnetic material processing requirements, etc. However, by reducing the total magnetic material volume while keeping the MEP multiplied by the magnetic material volume substantially the same, the overall magnetic material cost can be reduced. Additionally, the rotor 14 of FIG. 5 will be more easily magnetized, as compared to rotor 14 of FIG. 4.

As previously described, IPM geometries have reluctance torque in addition to magnetic torque due to permanent magnet field. The reluctance torque is produced due to the variation of rotor 14 saliency with rotor 14 position. This variation of the rotor 14 reluctance with the rotor 14 position produces rotor 14 saliency, which is the source of reluctance torque. When magnetic material is removed from regions 26 of FIG. 4 and replaced with non-magnetic material or kept empty, the rotor 14 reluctance in general does not change. Therefore, the reluctance torque is mostly unchanged. When the removal of magnetic material is compensated by increasing the MEP of the rotor 14 magnets or barriers formed by the magnetic material in FIG. 5, the motor torque is substantially unaltered. This is illustrated by finite element simulation seen in FIG. 6

The rotor 14 configurations of FIGS. 4 and 5 are optimized for maximum peak torque. The stator 12 winding is distributed and short pitched. This lowers the harmonics torque ripple. However, the presence of the rotor 14 and stator 12 slots introduce the commonly known "slot ripple" in the motor torque. The torque variation, due to slot ripple, for these rotor 14 geometries has a periodicity of one slot pitch as illustrated in FIG. 6.

Figure 6:
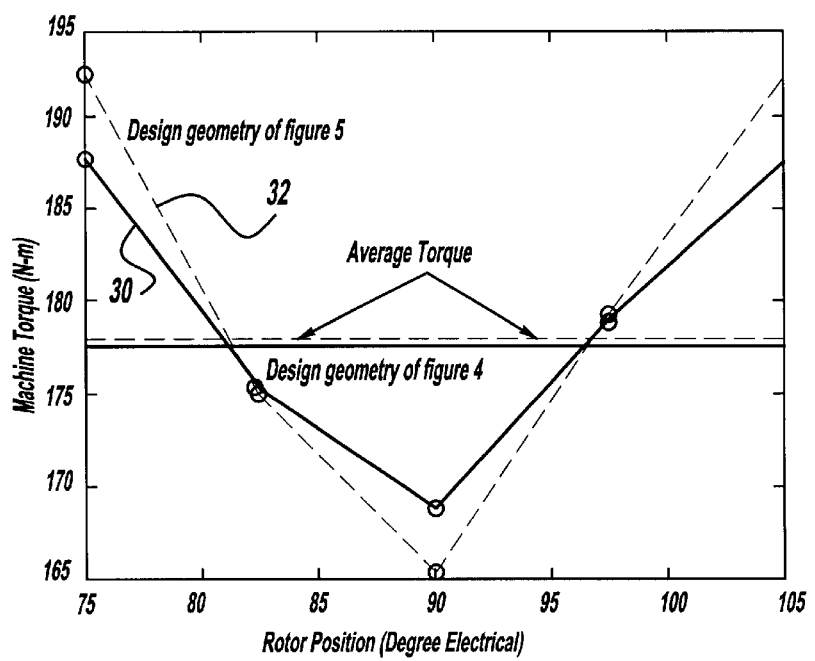
FIG. 6 is a graph of the developed torque of the rotor of FIG. 4 and FIG. 5.

Referring to FIG. 6, a solid line 30 represents the torque for the rotor geometry of FIG. 4 while a dashed line curve 32 represents the torque for the rotor geometry of FIG. 5. The average torque is slightly higher for the geometry of FIG. 5, as compared to FIG. 4. Therefore, the rotor 14 geometry of FIG. 5 produces slightly higher torque than the rotor 14 geometry of FIG. 4. Moreover, the rotor 14 geometry of FIG. 5 can be easily magnetized and would be substantially lower in cost.

While this invention has been described in terms of some specific embodiments, it will be appreciated that other forms can readily be adapted by one skilled in the art. Accordingly, the scope of this invention is to be considered limited only by the following claims.

What is claimed is:

1. A method of fabricating a rotor for an electric traction motor comprising the steps of:

forming cavities in the rotor;

injecting magnetic material in a portion of the cavities, wherein a portion of said cavities are left empty;

determining a first magnetic energy of said rotor for a representative magnetic material filling all of said voids in said rotor and providing injected magnetic material filling a portion of said voids with magnetic strength to generate a second magnetic energy such that said second magnetic energy is substantially equal to said first magnetic energy; and magnetizing said magnetic material with a wound stator field located in a housing of the electric motor.

2. The method of claim 1 further comprising the step of bonding said magnetic material with a plastic.

3. A method for fabricating an electric traction motor for a vehicle comprising:

providing a motor housing;

providing a wound stator field located in said housing;

providing a rotor magnetically interacting with said wound stator field, said rotor including an array of magnetic material, said magnetic material organized as a multi-layer configuration with said magnetic material arrange to progressively approach the center of said rotor;

providing voids configured in said rotor; and magnetizing said magnetic material with said wound stator field.

4. The method of claim 3 wherein said magnetic material is injected into said rotor in liquid form.

5. The method of claim 3 wherein said voids are partially filled with a heat conducting material.

6. A method for fabricating an electric traction motor for a vehicle comprising:

providing a motor housing;

providing a wound stator field located in said housing;

providing a rotor magnetically interacting with said wound stator field, said rotor including a permanent magnet;

providing voids configured in said rotor, a portion of said voids containing air during operation of said electric traction motor;

injecting a portion of said voids with a heat conducting epoxy;

injecting a portion of said voids with a magnetic material in fluid form to form a multilayer array of magnets arranged to progressively approach the center of said rotor; and magnetizing said magnetic material with said wound stator field.

7. The method of claim 6 further comprising the step of configuring said air filed voids in positions closer to the center of said rotor than the surface of said rotor.

8. The method of claim 6 further comprising the step of determining a first magnetic energy product of said rotor for a representative magnetic material filling all of said voids in said rotor and providing said injected magnetic material filling a portion of said voids with magnetic strength to generate a second magnetic energy product such that said second magnetic energy product is substantially equal to said first magnetic energy product.

* * * * *